Sept. 15, 1925.

R. POLK 1,553,630

FRUIT PEELING MACHINE

Filed Jan. 28, 1924

INVENTOR
Ralph Polk,
BY
Arthur M. Hood.
ATTORNEY

Sept. 15, 1925.

R. POLK 1,553,630

FRUIT PEELING MACHINE

Filed Jan. 28, 1924     6 Sheets-Sheet 4

INVENTOR
*Ralph Polk,*
BY
*Arthur M. Hood,*
ATTORNEY

Sept. 15, 1925.

R. POLK

FRUIT PEELING MACHINE

Filed Jan. 28, 1924

INVENTOR
Ralph Polk,
BY
Arthur M. Hood.
ATTORNEY

Sept. 15, 1925.

R. POLK

FRUIT PEELING MACHINE

Filed Jan. 28, 1924 6 Sheets-Sheet 6

1,553,630

INVENTOR
Ralph Polk,
BY
Arthur M. Hood.
ATTORNEY

Patented Sept. 15, 1925.

1,553,630

UNITED STATES PATENT OFFICE.

RALPH POLK, OF GREENWOOD, INDIANA.

FRUIT-PEELING MACHINE.

Application filed January 28, 1924. Serial No. 689,027.

*To all whom it may concern:*

Be it known that I, RALPH POLK, a citizen of the United States, residing at Greenwood, in the county of Johnson and State of Indiana, have invented a new and useful Fruit-Peeling Machine, of which the following is a specification.

My invention relates to apparatus for peeling citrus fruit and particularly to machines for removing the peel from grape fruit.

One of the objects of my invention is to provide a machine for quickly and readily removing the skin from grape fruit without marring the fruit and which will leave the fruit in its whole condition.

For the purpose of disclosing my invention, I have illustrated one embodiment thereof in the accompanying drawings, in which Fig. 1 is a side elevation of a machine embodying my invention;

Figure 10:
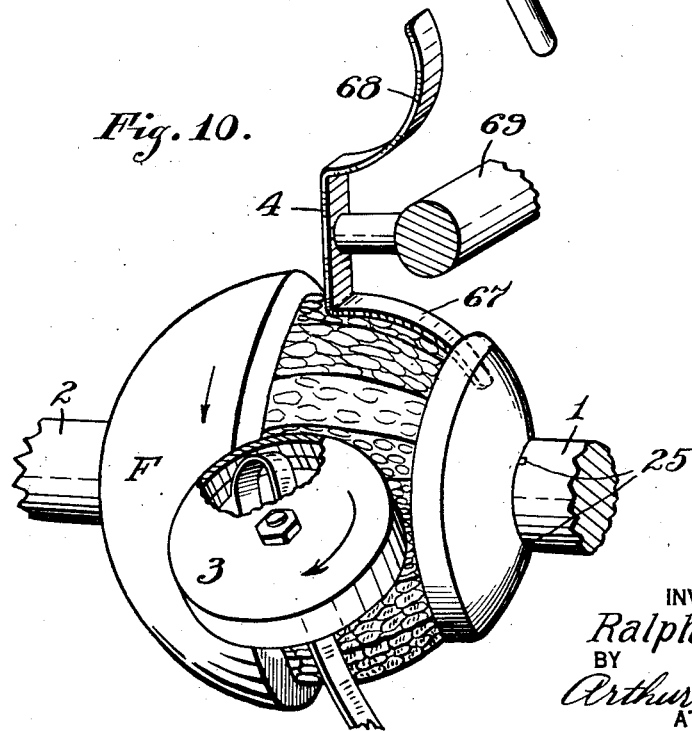
Fig. 10 is a schematic view showing the operation of the peeling knives.

In the structure illustrated, the fruit F is adapted to be held between a pair of chucks 1 and 2 which rotate and thereby rotate the fruit and is engaged by a rotating and oscillating circular knife 3 arranged to be resiliently urged against the fruit so that the peel between the ends is cut off in a ribbon-like strip, the knife being revolved about the fruit during the cutting operation. The knife cuts, or peels, the fruit between the ends as shown in Fig. 10 and, after the knife 3 has completed its operation, the ends are cut off by means of a slicing knife 4 which is inserted between the peel and the fruit.

The apparatus for manipulating the above parts and the above parts are mounted in a frame comprising the two side members 5 held in spaced and rigid relation by a cross brace 6. The chucks 1 and 2 between which the fruit F is held, are mounted, preferably being pinned thereto, on shafts 7 and 8 mounted in bosses 9 in the side members of the frame.

These shafts are splined in rotating bushings 11, each provided with driving sprockets 12. The key for the shafts permits the same to be moved longitudinally toward and away from one another for the purpose of grasping the fruit. For accomplishing this movement, I provide a pair of contractible and expansible jaws 13 mounted on a shaft 14 and having the free ends thereof forked to engage in annular channels 15 in the chucks. The jaws, at their rear ends, are provided with rollers 17 engaging in cam slots 18 in a cam member 19 mounted to rotate with a shaft 20. This shaft, at its outer end, is provided with a crank arm 21 connected by a link 22 with an operating handle 23 mounted on the side of the frame and having a dog and ratchet lock 24 so that, as the handle is moved toward the front of the machine, the cam slots 18 will be rotated to cause the arms on jaws 13 to approach one another thereby moving the chucks toward one another and causing them to engage the ends of the fruit to be peeled, forcing the teeth 25 in the ends of the chucks well into the peel so as to securely hold the fruit in position during the peeling operation.

The rotating knife 3 is supported at the upper end of an oscillating frame 26 in turn mounted on an oscillating platform 27. The frame 26 not only provides a bearing member for the shaft 28 of the knife 3, which is mounted at the upper end of said shaft, but also provides a support for the depth gauge 29 for the shaft. This depth gauge 29 preferably comprises an arcuate shoe 30 rockably supported by the pivot mounting 31 on a cross bar 32. The cross bar is supported from the frame 26 by means of four slidable posts 33 slidably mounted in bosses 34 formed at the sides of the frame 26 and interposed between the ends of the posts and bosses are suitable springs 35 which tend to hold the cross bar and with it the depth gauge 29 in a retracted position. For adjusting the amount of rocking movement permitted to the shoe 30, I provide adjustable screw stops 36 at each end of the cross bar 32.

The depth gauge 29 is adjusted relatively to the frame 26 by means of a pair of wedges 37 which are interposed between the cross bar 32 and rails 38 on the frame 26. These wedges are mounted at the upper ends of rack bars 39 which are held in position on the frame by a cross member 40 and are adapted to be engaged by pinions 41 mounted on a cross shaft 42 journaled in the frame 26 and carrying at its outer end, a hand wheel 43, whereby the rotation of the hand wheel 43 will cause a quick raising or lowering of the wedges 37 to get a quick adjustment of the depth gauge.

The frame 26, at its lower end, is hingedly mounted at 44 on the oscillating platform 27 which is supported on a hub 46 rotating on a vertical hollow stub shaft 47 supported in the casing 48. This hinged mounting of the lower end of the frame permits the upper end of the frame and with it the circular knife 3, to move relatively to the fruit F, and the upper end of the frame and with it the knife, is urged toward the fruit by a spring 49 interposed between the top of the platform 27 and a manipulating handle arm 50 secured to the frame and arranged to extend substantially at right angles thereto. The platform 27 is rotated to swing the knife about the periphery of the fruit by means of a worm gear 51 driven by a worm 52 from a shaft 53. The worm and platform are locked together by means of a dog 54 mounted on a rod 55 urged into locking position by a spring 56 surrounding the rod and interposed between the platform 27 and a collar 57 on the rod.

The shaft 28, carrying at its upper end, the circular knife 3, has a universal joint connection 58 with a vertical drive shaft 59 provided at its lower end with a beveled gear 60 meshing with a beveled gear 61 driven from the main driving shaft 62.

Figure 1:
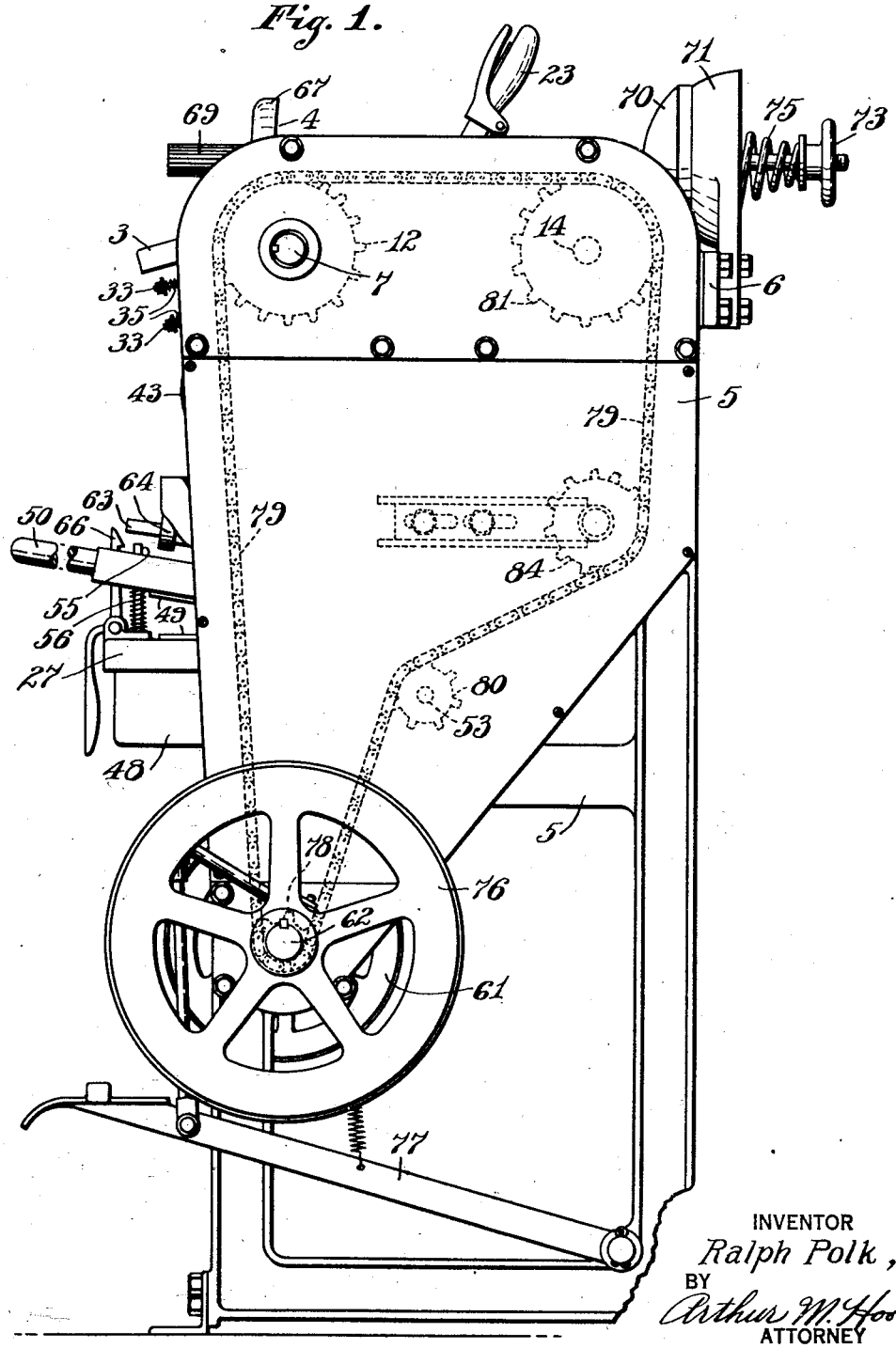
Figure 2:
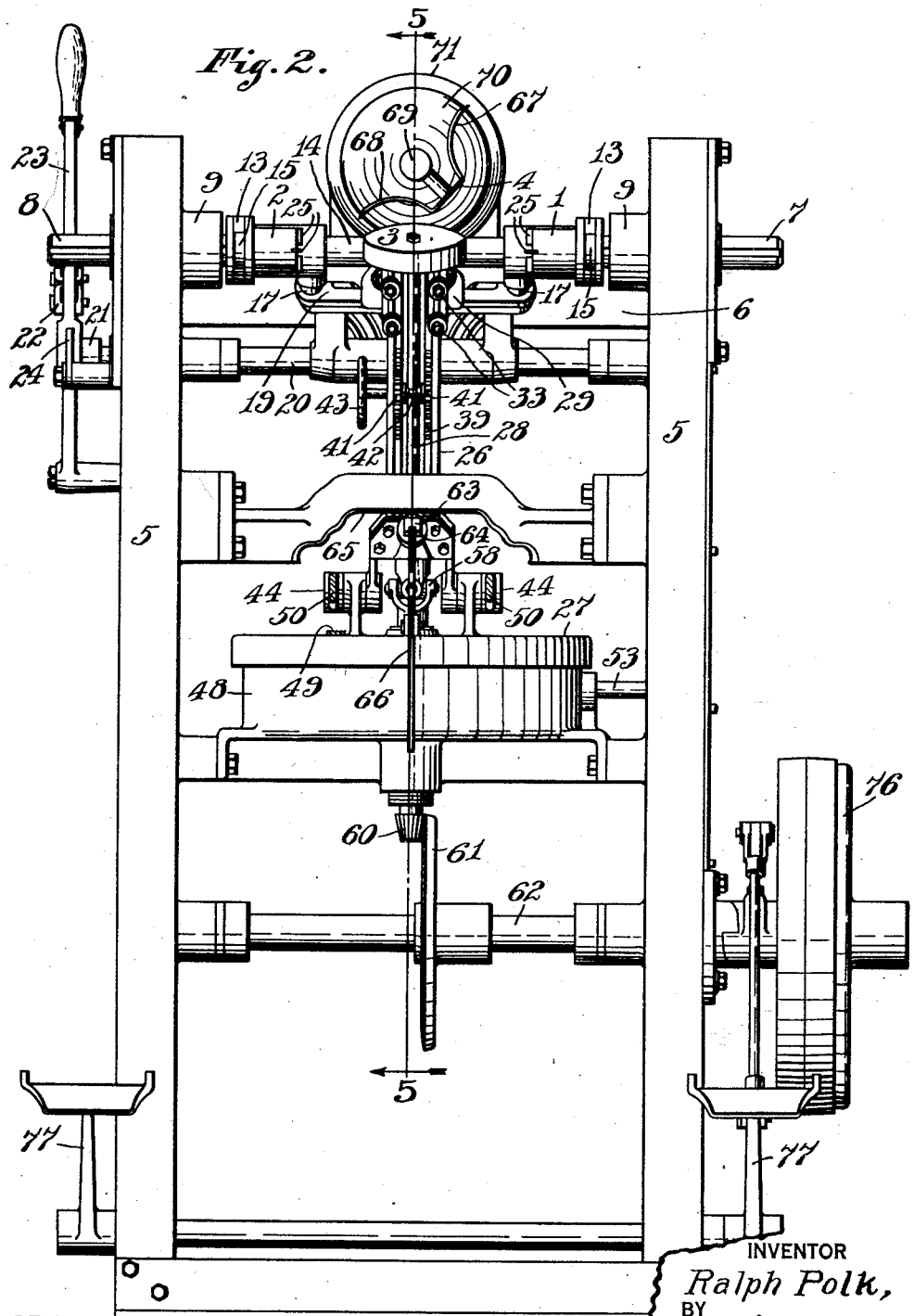
Fig. 2 is a front elevation thereof.
Figure 3:
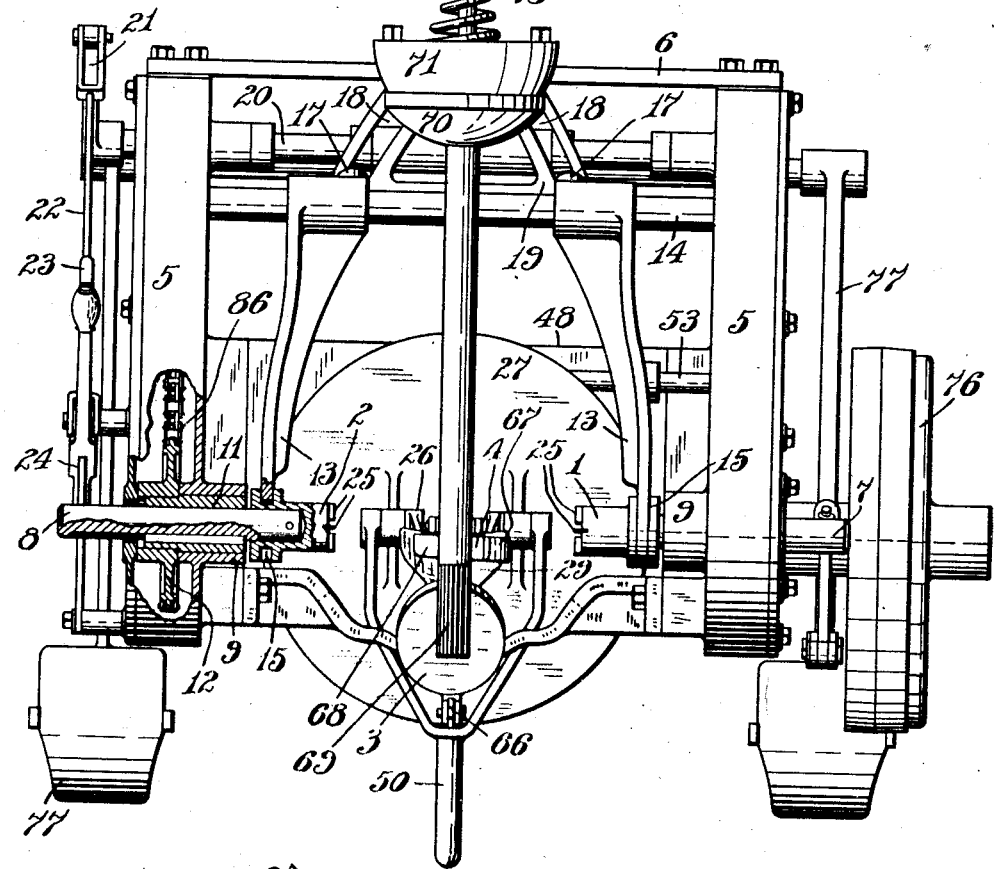
Fig. 3 is a plan view thereof, part of the same being shown in section.
Figure 4:
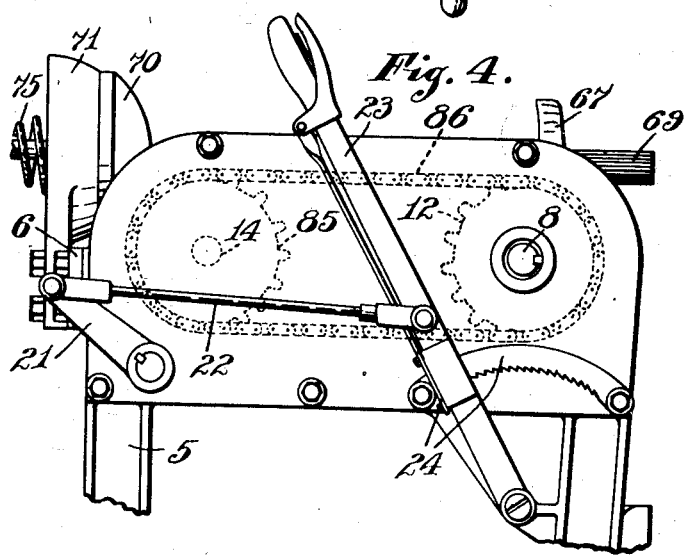
Fig. 4 is an enlarged detail showing the chuck drive and manipulating mechanism.
Figure 5:
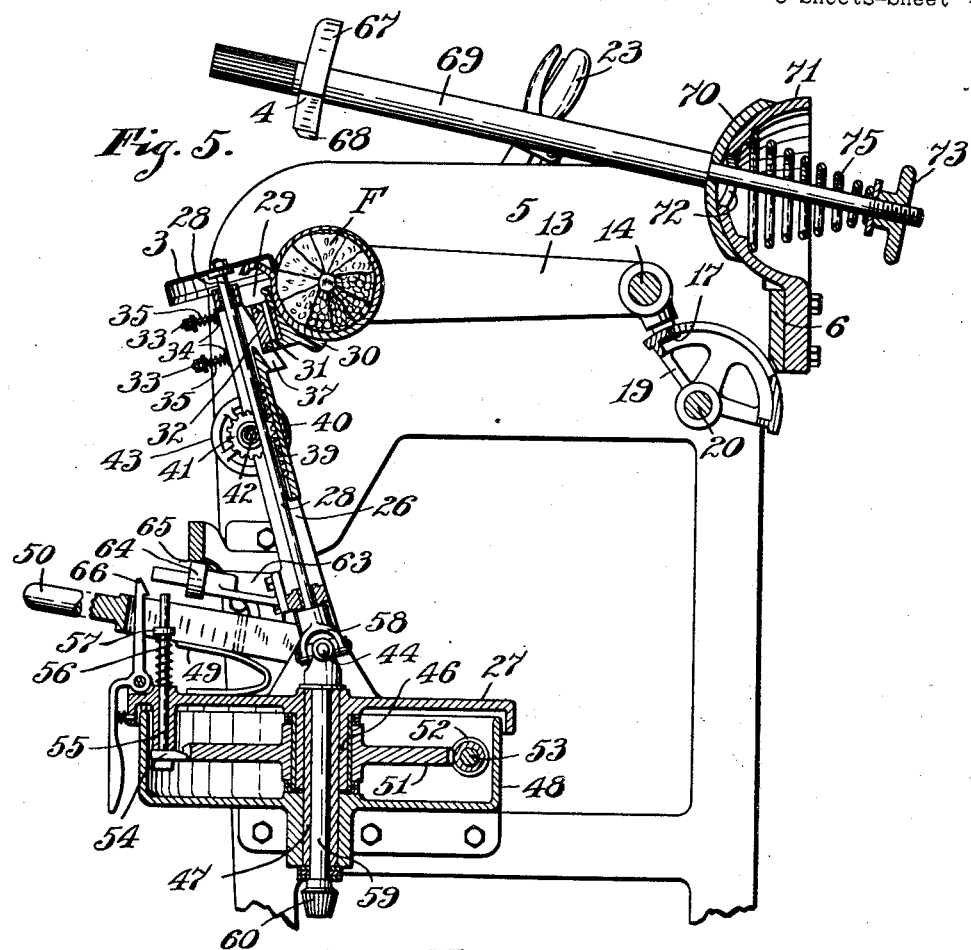
Fig. 5 is a sectional view on the line 5—5 of Fig. 2.
Figure 6:
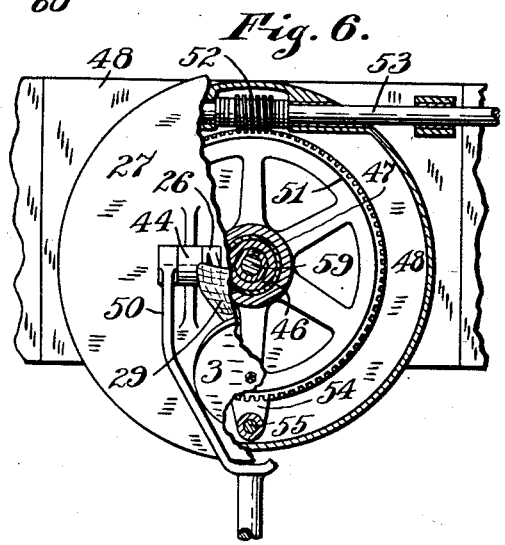
Fig. 6 is a detail section of the knife revolving mechanism.
Figure 7:
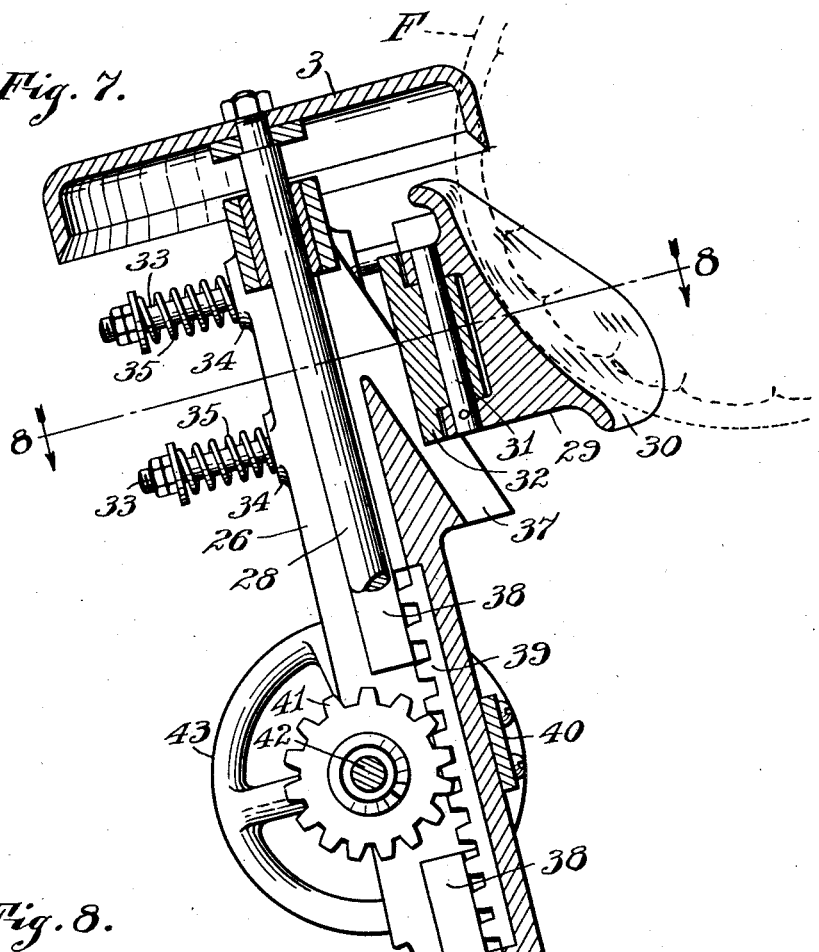
Fig. 7 is an enlarged detail of the rotary knife adjusting mechanism.
Figure 8:
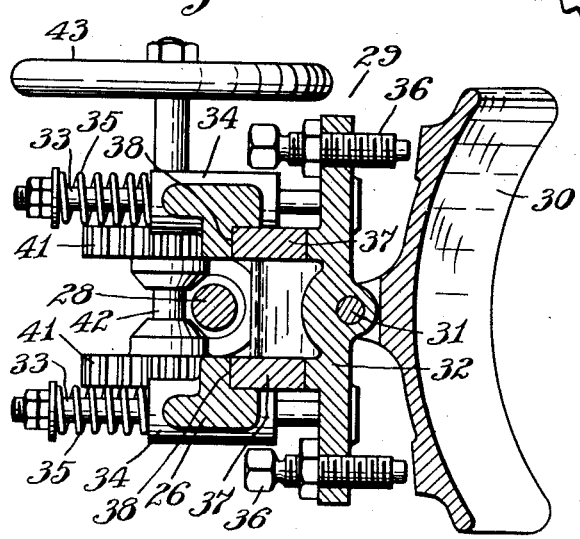
Fig. 8 is a sectional view taken on the line 8—8 of Fig. 7.
Figure 9:
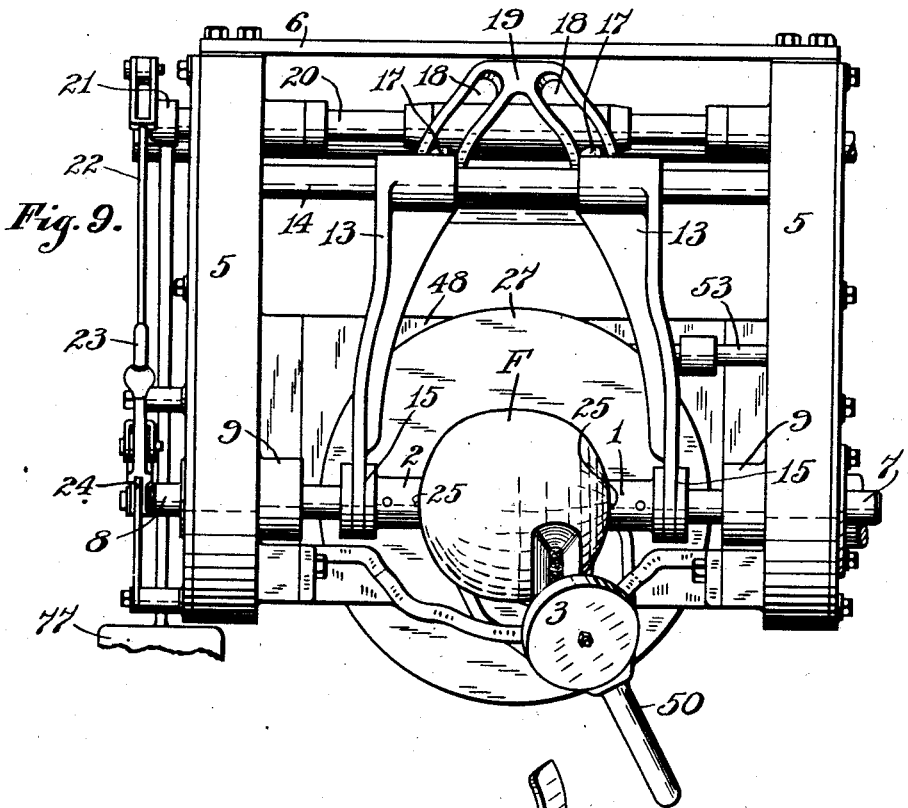
Fig. 9 is a plan view with the end cutting knife removed.

The frame 26, at its lower end, is provided with an arm 63 extending substantially at right angles thereto and parallel with the arm 50, which arm 63, at its outer end carries a roller 64 arranged to co-operate with the cam surface 65. This surface being such that during the cutting period of the knife the frame may swing the knife into engagement with the fruit, the cam surface being shaped, however, so as to prevent, in event there is no fruit in the chucks, the knife from swinging toward the chucks to such an extent as to engage the same. The two end portions of the cam surface 65 are such as to hold the knife completely disengaged from the fruit and when the arm 63 is depressed by the extreme left hand portion of the cam surface, looking at Fig. 2, the upper end of the rod 55 will be engaged by the arm 63 and moved downwardly to disengage the dog 54 from the worm 52, thereby drivingly disconnecting the platform from the power mechanism and the arm 63 is locked in this depressed position by a latch 66 so that, when the platform is moved in the opposite direction, the rotary knife will be held free of the fruit in the chucks or in a disengaging position.

The slicing knife 4 is provided for removing the peel on the end sections of the fruit and to this end comprises a pair of arcuate blades 67 and 68 supported on a "joy stick" 69. This stick, at its rear end, is provided with a semi-spherical plate, or collar 70, which fits over semi-spherical support 71. The end of the stick passes through an opening 72 in the support 71 and interposed between the rear face of the support and an adjustable thumb nut 73 on the end of the stick, is a coil spring 75, by which arrangement the stick 69 can be moved in most any direction and rotated on its own axis and at the same time, due to the friction between the plate 70 and the support 71, the stick, when moved out of the way of the operator, will remain in this position without further attention on the part of the operator. The apparatus is driven from the main shaft 62, which in turn is connected by means of a cone clutch 76 arranged to be operated by the pedals 77 disposed on opposite sides of the machine. The main shaft is provided with a sprocket wheel 78 over which passes a continuous driving chain 79, this chain being adapted to engage a sprocket 80 on the shaft 53 for the purpose of operating the platform driving worm, a sprocket 81 on a counter-shaft 14 and the sprocket 12 on the chuck shaft 7. An adjustable idler 84 is provided for taking up the slack of the sprocket. The counter-shaft 14, at its opposite end, is provided with a sprocket 85 over which passes a sprocket chain 86 in turn driving the sprocket wheel 12 on the opposite chuck shaft 8.

In operation, the peeling operation starts from the right hand side of the machine and in setting, the operator depresses one of the pedals 77, thereby disconnecting the machine from the power. The arm 50 is thrown to the right, thereby rotating the platform 27 to the right until the roller 64 engages the right hand portion of the cam surface 65, thereby holding the knife 3 out of engaging position. The fruit is then inserted between the chucks 7 and 8 and the handle 23 drawn toward the operator to close the chucks on the fruit, this movement forcing the teeth 25 on the faces of the chucks into the peel of the fruit. The operator then engages the cone clutch 76 to start the machine and at the same time releases the latch 66 which permits the rotary knife to be urged towards the fruit under the influence of the spring 49 and at the same time permits the dog 54 to engage the worm wheel 51, causing the platform 27 to rotate in one direction. As soon as the cam surface 65 permits the rotary knife to move into engagement with the fruit, the operator, by the manipulation of the hand wheel 43, may adjust the depth gauge 29 to the correct depth of cut for the rotary knife, preferably so that it will just cut into the pulp of the fruit. The fruit is now rotating against the edge of the knife. The rotary knife is likewise rotating so as to slice the peel and the knife is being moved gradually over the periphery of the fruit so that as the knife moves to the left, a continuous strip of peel is removed from the fruit to the complete depth of the peel, thereby leaving the fruit itself exposed. It will be noted that the cut of the knife commences a short distance away from the end of the fruit, thereby leaving a small cap of peel at the end. As soon as the rotary knife 3 has cleared the right hand side of this cap, the operator lowers the slicing arcuate blade 67 to position and, by inserting it under the cut edge of the cap and causing it to follow the contour of the fruit, this end cap is cut loose, without however, causing the fruit to be thrown out of the chucks, because the chucks press this loosened cap against the body of the fruit. The rotary peeling knife continues to move across the periphery of the fruit until the roller 64 engages the left hand side of the cam surface, when the arm 63 will be depressed, throwing the rotary knife 3 out of engagement with the fruit and at the same time depressing the rod 55 to disengage the dog 54 from the worm wheel 51. When the arm reaches its lowermost position, it will be engaged by the latch 66 and locked in this position. The rotary knife is now swung clear of the left hand cap of peel and the operator may loosen this cap by the use of the slicing blade 68 in the same manner as he loosened the right hand cap, after which the chucks may be released to remove the fruit and permit the insertion of a new fruit. The operator then rotates the platform 27 in a counter-clockwise direction by means of the arm 50 to bring the knife back to starting position for the new fruit and by releasing the catch 66 and at the same time again starting the machine, the machine in the mean time having been stopped by the operator for the insertion of a new fruit, the operation is again repeated on the new fruit.

I claim as my invention:

1. In a fruit peeling machine, the combination, with means for supporting the fruit and rotating the same on its own axis, of a circular band knife, means for urging the edge of said knife into engagement with the fruit, and an adjustable gauge bearing on said fruit for limiting the depth of cut of the knife and for causing the knife to follow the contour of the fruit and means for rotating said knife about the periphery of the fruit.

2. In a fruit peeling machine the combination with an oscillating platform, of an arm hingedly mounted on said platform, a shaft rotatably mounted in said arm, an annular paring knife mounted on said shaft, means for rotatably supporting the fruit to be peeled, means for urging said arm toward said fruit and a shoe on said arm adapted to bear on the fruit to prevent the knife from being urged into too deep engagement with the fruit.

3. In a fruit peeling machine the combination with an oscillating platform, of an arm hingedly mounted on said platform, a shaft mounted in said arm, an annular paring knife mounted on said shaft, means for supporting the fruit to be peeled, means for urging said arm toward said fruit, a shoe on said arm adapted to bear on the fruit for preventing the knife from being urged into too deep engagement with the fruit and means for laterally adjusting said shoe on said arm.

4. In a fruit peeling machine the combination with an oscillating platform, of an arm hingedly mounted on said platform, a shaft mounted in said arm, an annular paring knife mounted on said shaft, means for supporting the fruit to be peeled, means for urging said arm toward said fruit and a shoe rockably mounted on said arm adapted to bear on the fruit to prevent the knife from being urged into too deep engagement with the fruit.

5. In a fruit peeling machine the combination with an oscillating platform, of an arm hingedly mounted on said platform, a shaft mounted in said arm, an annular paring knife mounted on said shaft, means for supporting the fruit to be peeled, means for urging said arm toward said fruit, a shoe rockably mounted on said arm and adapted to bear on the fruit to prevent the knife from being urged into too deep engagement with the fruit and means for adjusting said shoe laterally relatively to the arm.

6. In a fruit peeling machine the combination with an oscillating platform, of an arm hingedly mounted on said platform, a shaft mounted in said arm, an annular paring knife mounted on said shaft, means for supporting the fruit, means for urging said arm toward the fruit, driving means for rotating the platform in one direction and means for automatically disconnecting said driving means after the platform has rotated a predetermined distance.

7. In a fruit peeling machine the combination with an oscillating platform, of an arm hingedly mounted on said platform, a shaft mounted in said arm, an annular paring knife mounted on said shaft, means for supporting the fruit to be peeled, means for urging said knife into peeling engagement with the fruit, means for automatically removing the knife from engagement with the fruit after a predetermined movement of the platform and means independent of said removing means for locking said knife in its removed position.

8. In a fruit peeling machine the combination with an oscillating platform, of an arm hingedly mounted on said platform, a shaft mounted in said arm, an annular paring knife mounted on said shaft, means for supporting the fruit to be peeled, means for urging said arm toward said fruit to move the knife into engagement therewith, driving means for operating said platform in one direction, means for automatically removing the knife from engagement with the fruit after a predetermined movement of the platform and means operated by the removal of the knife from the fruit for automatically disconnecting the driving means for said platform.

In witness whereof, I, RALPH POLK, have hereunto set my hand at Indianapolis, Indiana, this 24th day of January, A. D. one thousand nine hundred and twenty-four.

RALPH POLK.